W. P. MORROW.
CULTIVATOR.
APPLICATION FILED JAN. 10, 1913.
1,070,281.
Patented Aug. 12, 1913.
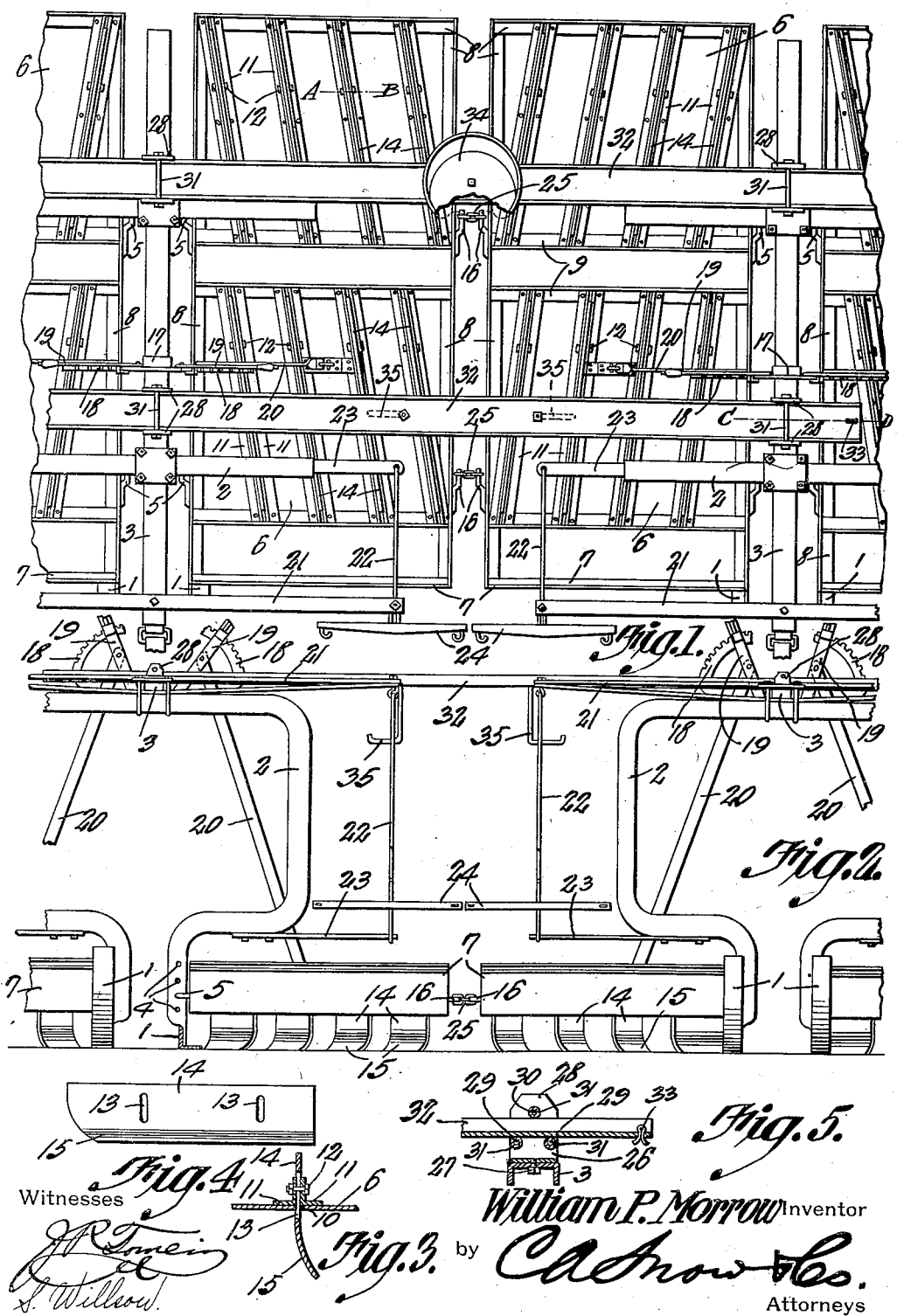

UNITED STATES PATENT OFFICE.

WILLIAM P. MORROW, OF WOODWARD, OKLAHOMA.

CULTIVATOR.

1,070,281. Specification of Letters Patent. Patented Aug. 12, 1913.

Application filed January 10, 1913. Serial No. 741,353.

*To all whom it may concern:*

Be it known that I, WILLIAM P. MORROW, a citizen of the United States, residing at Woodward, in the county of Woodward and State of Oklahoma, have invented a new and useful Cultivator, of which the following is a specification.

This invention relates to cultivators and is more particularly an improvement upon the structure disclosed in my co-pending application filed May 10, 1912, Serial No. 696,510.

One of the objects of the invention is to provide a cultivator of this character which can be used to cultivate two rows simultaneously, the said cultivator being provided with vertically adjustable soil engaging blades which operate as combined scrapers and weed cutters.

A further object is to provide improved means for coupling together the units of the machine whereby either or both of the units may be employed, one unit being useful for cultivating between two rows while the two units can be employed for simultaneously cultivating two rows.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a machine embodying the present improvements, the outer sections thereof being broken away. Fig. 2 is a front elevation of the structure shown in Fig. 1. Fig. 3 is an enlarged section on line A—B Fig. 1. Fig. 4 is a side elevation of one of the scraper blades. Fig. 5 is an enlarged section on line C—D Fig. 1.

Referring to the figures by characters of reference 1 designates parallel runners constituting the supports of one unit, the runners of this unit being connected by an upstanding yoke 2. Two of these yokes are arranged above each pair of runners and these yokes are designed to support a beam 3 extending across the centers thereof and bearing downwardly thereon, the beam being attached to the yokes in any suitable manner.

Formed in each side of each yoke 2 is an upwardly extending series of apertures 4 and any one of these apertures is adapted to receive a pintle 5 extending rearwardly from the inner side of one of the shiftable sections of the cultivator. Each of these sections is in the form of a sheet metal plate preferably rectangular, this plate being indicated at 6 and having its front end upturned, as at 7 while reinforcing angle strips 8 are secured along the edges thereof. Additional reinforcing angle strips 9 are extended transversely of the plate adjacent the center thereof. Obliquely disposed slots are formed in the plate 6 between the transverse strips 8 and the ends of the plate 7 and these slots have been indicated at 10. Secured upon the plate and along the side edges of each slot are angle strips 11 connected by cross bolts 12. These bolts extend through slots 13 formed within soil engaging blades 14. These blades extend between the strips 11 and downwardly through the slots 10 and the lower portions of the blades are curved laterally, as shown at 15 in Fig. 3. The slots 13 extend substantially vertically and it will be apparent that, by loosening bolts 12, the blades 14 can be adjusted vertically and then held by tightening bolts 12. In the form shown in the drawings, each shiftable section of the cultivator has two transverse series of blades 14, the blades of each series being parallel. It will be seen that rearwardly extending pintles 16 are arranged upon those sides of the sections or plates 6 remote from the yokes 2 so that, if desired, the sections can be reversed. In other words, the sections can be arranged as shown in Fig. 1 with the blades 14 on the two plates 6 converging rearwardly toward the space below the beam 3 or, by reversing the positions of the two plates 6 on the unit, the said blades will be positioned along lines diverging rearwardly. This is due to the fact that either the pintle 5 or the pintles 16 can be placed within the openings 4.

Secured to the beam 3 is a bracket 17 having oppositely extending segments 18, there being levers 19 fulcrumed on the bracket and coöperating with the respective segments, these levers being provided with the usual arrangement of spring pressed pawl for engaging the segments so as thus to be held against movement. Each lever is connected, by a rod 20, to one of the plates 6 so that, by shifting the lever, the said plate 6 can be swung upwardly or downwardly about the pintle 5 as an axis and thus shift the blades 14 into or out of engagement with the soil.

For the purpose of equalizing draft, an equalizer of novel form may be arranged in front of each unit. This equalizer includes a centrally pivoted lever 21, the ends of which are pivotally connected to the upper ends of downwardly extending bars 22, the lower ends of these bars being pivotally attached to laterally extending arms 23 connected to the front yoke 2. Swingletrees 24 are pivotally connected to the bars 22.

It will be apparent that where the device is made up of but one unit having central yokes and a plate 6 at each side of the yokes, the yokes can be caused to straddle a single row and the blades 14 will engage the soil at opposite sides of the row and scrape it toward or from the row as desired, these blades likewise operating to cut up the weeds in the paths thereof. Should it be desired to combine two units so as to simultaneously cultivate two rows, the pintles upon the inner sides of the two units can be connected by links 25, as shown in Fig. 1. Saddles 26 are then pivotally mounted, as at 27, upon the beam 3 of the two units, these saddles being preferably located near the upper ends of the yokes 2. Each saddle has its ends extending upwardly, as shown at 28 and secured in these upwardly extending ends are lower rods 29. An upper rod 30 is also mounted between the upturned ends of each saddle and above the center of the space between the lower rods. Each of the rods 29 and 30 carries a roller 31. A cross beam 32, preferably formed of a channeled strip, bears upon the lower rollers 31 of the corresponding saddles and extends under the upper rollers 31 carried by said saddles. Stop pins 33 may be extended through the end portions of the beams 32 so as to prevent said beams from being withdrawn from the saddles. The rear beam 32 constitutes a support for the seat 34 occupied by the driver, this seat being located above the space between the two units. Foot rests or stirrups 35 may be suspended from the front beam 32 near the center thereof. With this structure it will be apparent that when the machine is drawn forward, the inner plates 6 of the two units will travel between two rows while the arches or yokes of the two units will straddle the respective rows, thereby bringing the outer plates of the two units beyond the straddled rows. Obviously therefore, when the machine is drawn forward, the soil may be scraped either toward or from the rows simultaneously.

It is to be understood that instead of utilizing the trees 24 and the equalizing mechanism described, a tongue may be extended forward from each beam 3. This construction is so obvious that it is not deemed necessary to illustrate it.

What is claimed is:—

1. A cultivator including yokes, supporting means connected to the lower ends thereof, members hingedly connected to said supporting means and extending in opposite directions from the yokes, and vertically adjustable obliquely disposed blades carried by each of said members.

2. A cultivator including row straddling yokes, supporting devices secured thereto, oppositely extending members hingedly connected to the yokes, said members being interchangeable, and vertically adjustable obliquely disposed blades carried by and extending below each of said members.

3. A cultivator including row straddling yokes, supporting means connected to the lower ends thereof, members extending in opposite directions from the yokes, each member including a plate and parallel obliquely disposed soil engaging blades extending through the plate and adjustable vertically relative thereto.

4. A cultivator including oppositely extending hingedly connected members spaced apart, said members being adapted to travel at opposite sides of a row and being connected, and obliquely disposed blades carried by each member and each blade being adjustable upwardly and downwardly, the lower portion of each blade being curved laterally throughout its length.

5. A cultivator including spaced units each including spaced connected members hingedly mounted and adapted to travel at opposite sides of a row, a beam supported above and movable with the members of each unit, connecting members extending transversely of the beam and shiftable in the direction of their lengths, and flexible connections between the inner members of the units.

6. A cultivator including spaced units each including row straddling yokes, oppositely extending hinged members connected to the lower portions of the yokes, a beam mounted on the yokes, and means for independently adjusting the members angularly, and connecting beams extending transversely of the first named beams and shiftable in the direction of their lengths, and flexible connections between the inner members of the two units, one of the connecting beams constituting a seat support.

7. A cultivator including spaced units each made up of row straddling elements and hinged members extending in opposite directions from said elements, said members including soil engaging blades obliquely disposed, beams supported by the row straddling elements and connections shiftable transversely of the cultivator, one of said connections constituting a seat support.

8. A cultivator including spaced units each made up of row straddling elements, a beam mounted on said elements, oppositely extending members hingedly connected to the elements and including obliquely disposed soil engaging blades, means for independently adjusting said members angularly, flexible connections between the inner members of the two units, connecting devices extending transversely of and slidable upon the beams.

9. In a cultivator, the combination with a plate having an upturned front end and a plurality of obliquely disposed slots, of upstanding portions along the sides of the slots and secured to the plate, blades adjustable upwardly and downwardly between said portions and within the slots, and means extending through the blades and said upstanding portions for securing the blades against movement.

10. A cultivator including spaced units, each having row straddling yokes, means extending in opposite directions from the yokes for engaging and scraping the soil, a beam mounted on the yokes, saddles pivotally supported by the beam, and connecting members slidably mounted within the saddles, one of said members constituting a seat support.

11. A cultivator including spaced units, each having row straddling yokes, means extending in opposite directions from the yokes for engaging and scraping the soil, a beam mounted on the yokes, saddles pivotally supported by the beam, connecting members slidably mounted within the saddles, one of said members constituting a seat support, flexible connections between the inner soil engaging members of the two units, and means for independently adjusting the members of the units angularly relative to the yokes.

In testimony that I claim the foregoing as my own, I have hereto affixed my signature in the presence of two witnesses.

WILLIAM P. MORROW.

Witnesses:
RALPH F. GASTON,
EARNEST HAWKINS.

---

Copies of this patent may be obtained for five cents each, by addressing the "Commissioner of Patents, Washington, D. C."